Figure 1:
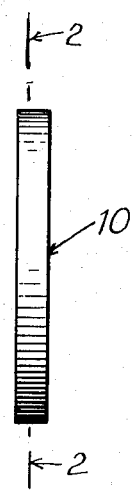

Feb. 7, 1956  J. J. GARELICK  2,733,776
FILTERS FOR RESPIRATORS
Filed Aug. 28, 1952

INVENTOR.
JUDITH J. GARELICK
BY Benj. T. Rauber
ATTORNEY 2,733,776
Patented Feb. 7, 1956

2,733,776
FILTERS FOR RESPIRATORS

Judith J. Garelick, Brooklyn, N. Y., assignor to Pulmosan Safety Equipment Corp., Brooklyn, N. Y., a corporation of New York Application August 28, 1952, Serial No. 306,790

6 Claims. (Cl. 183—45)

My present invention relates to an improved filter for removing particles from air and particularly to a filter for respirators. It also relates to a process for improving the filtering properties of fibrous filters.

In filters made of fibrous materials for use in respirators, it is desirable to remove very fine suspended particles of a size ranging downwardly below ten microns and particularly to remove fine particles of silica or pneumoconiosis producing materials. It is, however, necessary to avoid filters which have a high resistance to the passage of the gas, as such a high resistance increases the difficulty of breathing through the filter.

In my invention I provide a filter of suitable fibrous fabric, preferably of wool, treated with a chlorinated paraffine solid, preferably the 70% chlorinated paraffin known under the trade-name "Chlorowax," and fulled or pressed to bring the fibres into a narrow spacial relation and thus to provide narrower passages between the fibres. The chlorinated paraffine "Chlorowax," by reason of its special physical properties, serves to facilitate and improve the ability of the felt to intercept and hold particles. It enables fine particles to be retained by the filter and thus to be removed from the air without tending to clog excessively the narrow passages. It also provides a maze to increase the length of travel of the air through the filter. Particles contacting the "Chlorowax" are retained in the filter as the air passes through.

The fabric to which the invention is applied and which forms the base structure of the filter may be of any suitable fibre but pure wool felt is preferred as it is capable of most effective felting, pressing, or equivalent working to form a uniform fibre spacing and to provide gas passages of the most effective dimensions.

The chlorinated paraffin may be applied to the filter in any suitable manner to supply and distribute to each individual fibre a coating equal to between 10% and 100% of the weight of the felt, the best value being around 25%. It may be applied in any suitable manner which will distribute it to the individual fibres uniformly as, for example, by spraying the fibres with a suitable solution, or immersing the fibres in a solution of the chlorinated paraffin and squeezing out the excess. After thus being treated, the wool is worked and pressed to give it a compact uniform thickness. During fulling the chlorinated paraffin promotes the uniform drawing together of the fibres until a maximum shrinkage or drawing together has been attained, after which further fulling or shrinking can be obtained only by excessive working and only to small additional advantage.

Any suitable solvent may be used for the chlorinated paraffin as the particular nature of the solvent does not enter into the final product. A volatile solvent is preferred so that upon completion of the immersion and removal of the felt therefrom, the solvent will evaporate leaving the chlorinated paraffin uniformly distributed on the fibres.

Suitable volatile solvents include carbon tetrachloride, trichlorethylene, mineral spirits, turpentine, xylol and similar solvents.

The solution preferably contains from 3% to 40% or above, the best concentration being about 10%. The wool or other fibrous fabric or felt is immersed in the solution, squeezed to remove excess liquid and the solvent evaporated, leaving a deposit or coating of chlorinated paraffin equal to from about 10% to about 100% of the weight of the felt, the best value being about 25%. The amount may in any given case be selected to obtain the highest efficiency without substantially reducing the porosity or increasing the resistance to flow of air through the filter. A ⅛ inch all wool felted material is suitable for respirators. However, thinner or thicker wool felt, felts containing a portion of wool, or felts of other suitable compositions may be used.

After the felt has dried it is softened and compressed by means of manipulation and pressure as, for example, by bending the fabric or felt and pressing it. This serves to draw the fibres together and produce a more uniform, finer structure.

As a specific example of the process, a pure wool felt filter of suitable size for a respirator and of ⅛ inch thickness was immersed in a solution of "Chlorowax" in carbon tetrachloride and of a concentration of about 25%, then removed from the solution and squeezed to remove excess solution. Upon evaporation of the solvent, the filter was then worked or fulled and pressed and was then ready for mounting in a respirator.

Figure 2:
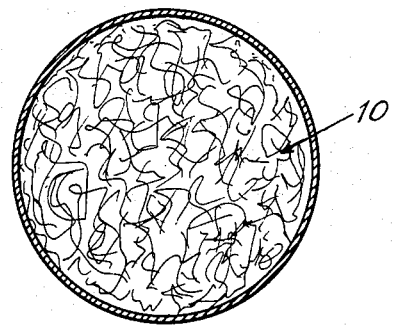
Figure 3:
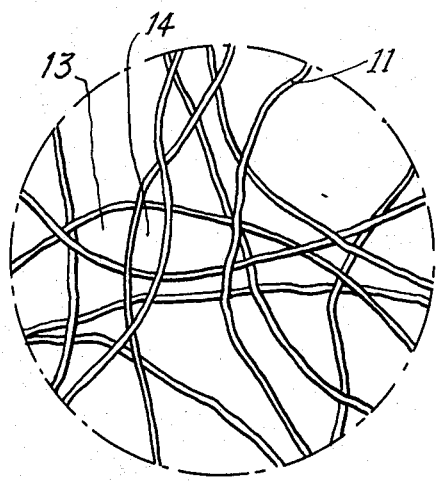
Figure 4:
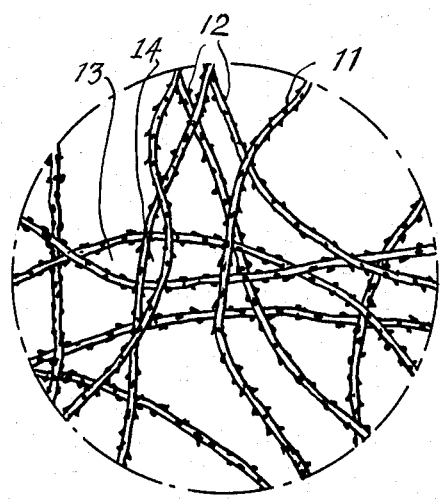

An example of an embodiment of the invention is illustrated in the accompanying drawings, in which, Fig. 1 is a side view of a respirator filter embodying the invention, Fig. 2 is a face view of the filter, Fig. 3 is an enlarged or magnified view in the nature of a photo-micrograph of a view of the fibres before being treated according to my present process, and Fig. 4 is a similar view of the fibres after being subjected to my process.

In the embodiment shown in Figs. 1 and 2 the filter comprises a disc 10 of matted or felted fibres. This disc is of substantial thickness as shown in the side view of Fig. 1.

As shown in Fig. 3 the individual fibres 11 are arranged in random fashion, interweaving and forming spaces or pores between individual fibres. The spaces are of irregular size and shape.

After being treated with the chlorinated paraffin, "Chlorowax," and fulled and pressed according to my invention, the fibres have the appearance shown in Fig. 4, in which each fibre is coated with the "Chlorowax," covering the surface of the fibres, and which may at random intervals draw up into minute beads or globules, indicated at 12 in Fig. 4.

As a result of the working or fulling and pressing the fibres draw together and narrow the spaces between the fibres. For example the spaces indicated at 13 and 14 in Figs. 3 and 4 become much smaller in Fig. 4 than in Fig. 3. Thus, fine particles contained in the air passing through the filter have a much higher tendency to come into contact with the fibres and be trapped by them. The beads or globules 12 aid in catching suspended particles but do not appreciably obstruct the passage of air through the filter or increase its resistance to flow. The chlorinated paraffin tends to facilitate the drawing of the fibres together into meshes of more uniform size thereby avoiding large pores and providing a maximum of particle retaining pores with a minimum of obstruction or restriction of the air passage.

The improvement in filtering qualities imparted to a felt by chlorowax may be demonstrated by comparative tests of untreated felt, felt treated with paraffin wax and felt treated with "Chlorowax." When air containing fine silica dust is drawn through untreated felt filter a large amount of dust penetrates the felt. For example the dust deposited from the filtered air by an electric precipitator in 30 minutes is approximately 8 mg. Impregnation of the wool felt with paraffin wax improves the filtering efficiency about 40% for a small reduction in the porosity of the filter. A similar felt after impregnation with "Chlorowax," with a similar small reduction in porosity, had a filtering efficiency 95% greater than the untreated felt.

The "Chlorowax" is odorless and non-toxic.

Having described my invention, what I claim is:

1. A filter for gases which comprises a fibrous wool fabric, the fibres of said fabric having a coating of a solid chlorinated paraffin, equal in amount to from about 10% to about 100% of the weight of said fabric.

2. The filter of claim 1 in which said fabric is felted wool.

3. The filter of claim 1 in which said chlorinated paraffin is a 70% chlorinated paraffin.

4. The filter of claim 1 in which said fibrous fabric has been contracted by working and pressing to substantially its maximum shrinkage.

5. The filter of claim 1 in which said coating has minute protuberances on said fibres.

6. A filter for gases which comprises a wool felt containing about 25% of its weight of a 70% chlorinated paraffin solid distributed as a coating on the fibres of said felt said felt being fulled and said coating having protuberances.

References Cited in the file of this patent

UNITED STATES PATENTS

| | | |
|---|---|---|
| 1,570,138 | Gat | Jan. 19, 1926 |
| 1,841,347 | Tuttle | Jan. 12, 1932 |
| 2,019,241 | Weiss | Oct. 29, 1935 |
| 2,083,132 | Williams et al. | June 8, 1937 |
| 2,326,233 | Leatherman | Aug. 10, 1943 |
| 2,514,145 | Stevens | July 4, 1950 |
| 2,601,598 | Daniel et al. | June 24, 1952 |
| 2,640,000 | Seyb | May 26, 1953 |